United States Patent
Sweo (10) Patent No.: US 7,337,526 B2
(45) Date of Patent: Mar. 4, 2008

(54) METHOD FOR MANUFACTURING SQUIRREL CAGE ROTOR

(76) Inventor: Edwin A. Sweo, 9905 Lake Washington Blvd. NE., Bellevue, WA (US) 98004

( * ) Notice: Subject to any disclaimer, the term of this patent is extended or adjusted under 35 U.S.C. 154(b) by 90 days.

(21) Appl. No.: 11/362,966

(22) Filed: Feb. 27, 2006

(65) Prior Publication Data

US 2006/0150396 A1 Jul. 13, 2006

Related U.S. Application Data

(62) Division of application No. 10/996,562, filed on Nov. 23, 2004, now abandoned.

(60) Provisional application No. 60/530,218, filed on Dec. 17, 2003.

(51) Int. Cl.
*H02K 15/02* (2006.01)
*H02K 15/10* (2006.01)

(52) U.S. Cl. ............... 29/598; 29/596; 164/112; 164/332; 310/211

(58) Field of Classification Search .......... 29/596–598, 29/732–736; 310/42, 197, 172, 211; 164/120, 164/320, 319
See application file for complete search history.

(56) References Cited

U.S. PATENT DOCUMENTS

| | | | |
|---|---|---|---|
| 3,183,431 A | 5/1965 | Ford | 322/32 |
| 3,571,693 A | 3/1971 | Riaz | 322/32 |
| 4,229,689 A | 10/1980 | Nickoladze | 322/32 |
| 4,246,531 A | 1/1981 | Jordan | 322/28 |
| 4,305,001 A | 12/1981 | Vamaraju et al. | 290/5 |
| 4,455,522 A | 6/1984 | Lipo | 318/809 |
| 4,472,673 A | 9/1984 | Miller | 322/32 |
| 4,760,300 A * | 7/1988 | Yoshida et al. | 310/211 |
| 4,858,304 A * | 8/1989 | Weldon et al. | 29/598 |
| 4,994,684 A | 2/1991 | Lauw et al. | 290/52 |
| 5,028,804 A | 7/1991 | Lauw | 290/40 |
| 5,083,077 A | 1/1992 | Wallace et al. | 322/32 |
| 5,193,266 A * | 3/1993 | Caputo | 29/598 |
| 5,239,251 A | 8/1993 | Lauw | 318/767 |

(Continued)

OTHER PUBLICATIONS

Koch, B., Spée, R., Clever, B. 1997 "A Comparison of Stack Preparation Methods For Bar Insulation In Diecast Rotors." IEEE-IAS Annual Meeting, Oct. 5-9, pp. 182-187.

(Continued)

*Primary Examiner*—Minh Trinh
(74) *Attorney, Agent, or Firm*—Ronald M. Anderson (57) ABSTRACT

Ceramic adhesive is applied inside the slots of an electric machine squirrel cage rotor prior to casting or insertion of rotor conductors. This heat-resistant insulation provides superior electrical insulation that is also mechanically rugged, thus enabling casting of squirrel cage rotors by die or cost-effective consumable pattern casting. The consumable pattern cast copper rotors are electrically well insulated, thus minimizing rotor losses. The ceramic insulation in cast rotors enables longer conductors to be cast by thermally insulating the molten metal from the cooler laminations. The ceramic insulation in fabricated rotors withstands the high temperatures of end ring attachment. This method is applicable to both conventional induction machine rotors and brushless doubly-fed induction machine rotors and provides the degree of electrical isolation of the bars from the laminations needed to avoid excessive parasitic torques in doubly-fed machines, while ensuring adequate thermal conductivity to dissipate conductive bar heat to the laminations.

32 Claims, 9 Drawing Sheets

U.S. PATENT DOCUMENTS

| | | | | |
|---|---|---|---|---|
| 5,488,984 | A | | 2/1996 | Fahy .......................... 164/91 |
| 5,636,434 | A | | 6/1997 | Okey et al. ................... 29/605 |
| 5,798,631 | A | | 8/1998 | Spee et al. ................... 322/25 |
| 5,937,930 | A | * | 8/1999 | Nakamura et al. .......... 164/112 |
| 6,088,906 | A | | 7/2000 | Hsu et al. ..................... 29/598 |
| 6,278,211 | B1 | | 8/2001 | Sweo .......................... 310/114 |
| 6,453,980 | B1 | * | 9/2002 | Williams ..................... 164/137 |
| 6,856,062 | B2 | * | 2/2005 | Heiberger et al. .......... 310/178 |

OTHER PUBLICATIONS

Shoudao, Huang et al. ND. "A study of the control strategy on rotor field orientation for brushless doubly-fed machine." Paper. Dept. of Electr. Eng., Hunan University, China: pp. 509-513, 2000.

Zhou, D. and R. Spee. 1996. "Field Oriented Control Development for Brushless Doubly-Fed Machines." IEEE-IAS Annual Meeting: 304-10.

Hopfensperger, B. et al. 2001. "Combined magnetising flux oriented control of the cascaded doubly-fed induction machine." IEEE Proc. Electr. Power Appl. 148:4 (Jul.) pp. 354-362.

Lun, Xie et al. 2001. "The Research of Brushless Doubly-Fed Ac Excited Induction Machine Drive." IECMS: pp. 975-995.

Leonhard W. 1985. "Control of Electrical Drives." Regelung in der elektrischen Antriebstechnik. Springer-Verlag, Berling: pp. 244-254.

* cited by examiner

FIG. 9

METHOD FOR MANUFACTURING SQUIRREL CAGE ROTOR

RELATED APPLICATIONS

This application is based on prior copending application Ser. No. 10/996,562 filed Nov. 23, 2004, now abandoned which is based on prior provisional application Ser. No. 60/530,218, filed on Dec. 17, 2003, the benefit of the filing dates of which is hereby claimed under 35 U.S.C. §§ 119(e) and 120.

FIELD OF THE INVENTION

The present invention generally pertains to squirrel cage rotors of electrical induction machines, including both conventional singly-fed induction machine rotors and brushless doubly-fed rotors, and more specifically, pertains to the use of a ceramic adhesive insulation that is applied on the interior surface of the slots during the manufacture of such rotors, prior to either the casting or insertion of rotor conductors within the slots.

BACKGROUND OF THE INVENTION

The rotor slot conductors of squirrel cage rotor electric machines must be electrically insulated from the steel lamination stack of the rotor to prevent stray electrical currents from leaking into the lamination stack. Such currents cause loss of efficiency and an unbalanced magnetic pull in conventional induction machines. The insulation system that is employed for such machines must withstand subsequent manufacturing operations, such as the die casting of cast rotors or the insertion of fabricated bars within the slots, and the welding or brazing of end rings on the fabricated rotors. In addition, the insulation system that is employed must also withstand the thermal, electrical, and centrifugal stresses that occur during operation of the electrical machine.

In brushless doubly-fed induction machines, cage rotor bar voltages during normal operation can be much higher than in conventional induction machines, and these machines therefore require better insulation than conventional induction machines for successful operation. Other effects must also be taken into consideration in doubly-fed electrical induction machines. For example, the parasitic torque effects of doubly-fed rotor leakage are described by Koch and Spee in their paper entitled, "A Comparison of Stack Preparation Methods for Bar Insulation in Die Cast Rotors," pp. 182-187, presented at the IEEE Industry Applications Society Annual Meeting, Oct. 5-9, 1997.

Prior Art Die-Cast Rotors and Insulation Systems

Figure 1A:
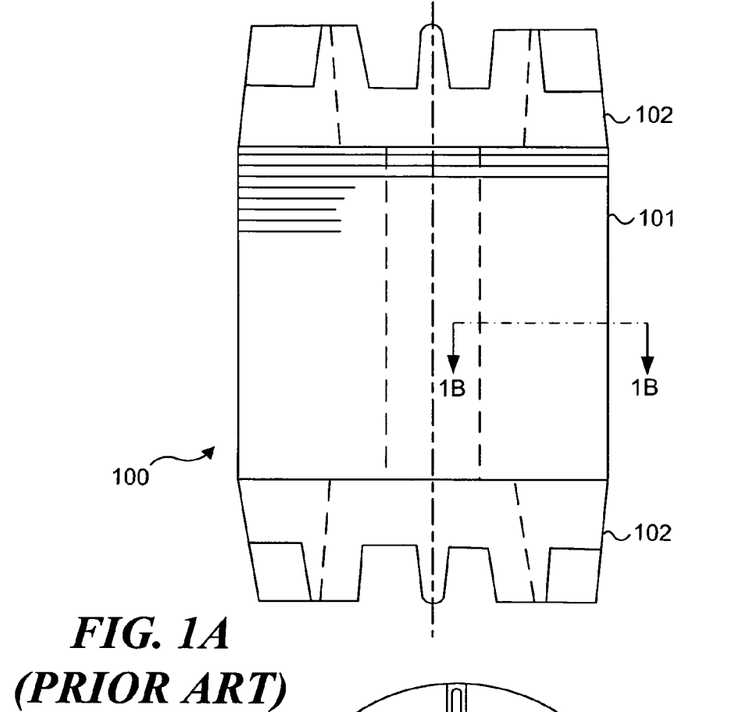
FIG. 1A (prior art) is a side-elevational view of a die cast cage rotor for a conventional induction machine employing conventional slot insulation.
Figure 1B:
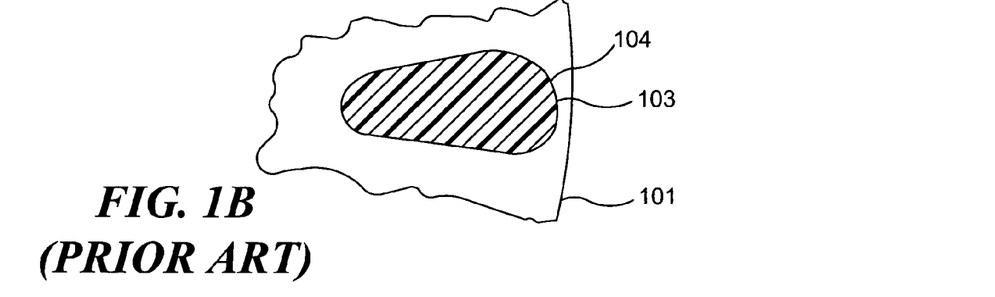
FIG. 1B (prior art) is an enlarged portion of a cross-sectional view of the die cast cage rotor, taken along section line 1B-1B, showing one slot.
Figure 1C:
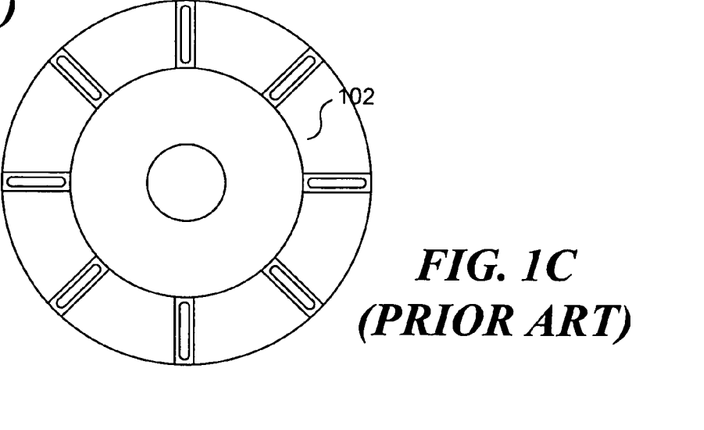
FIG. 1C (prior art) is an end view of the die cast cage rotor of FIG. 1A.
Figure 2:
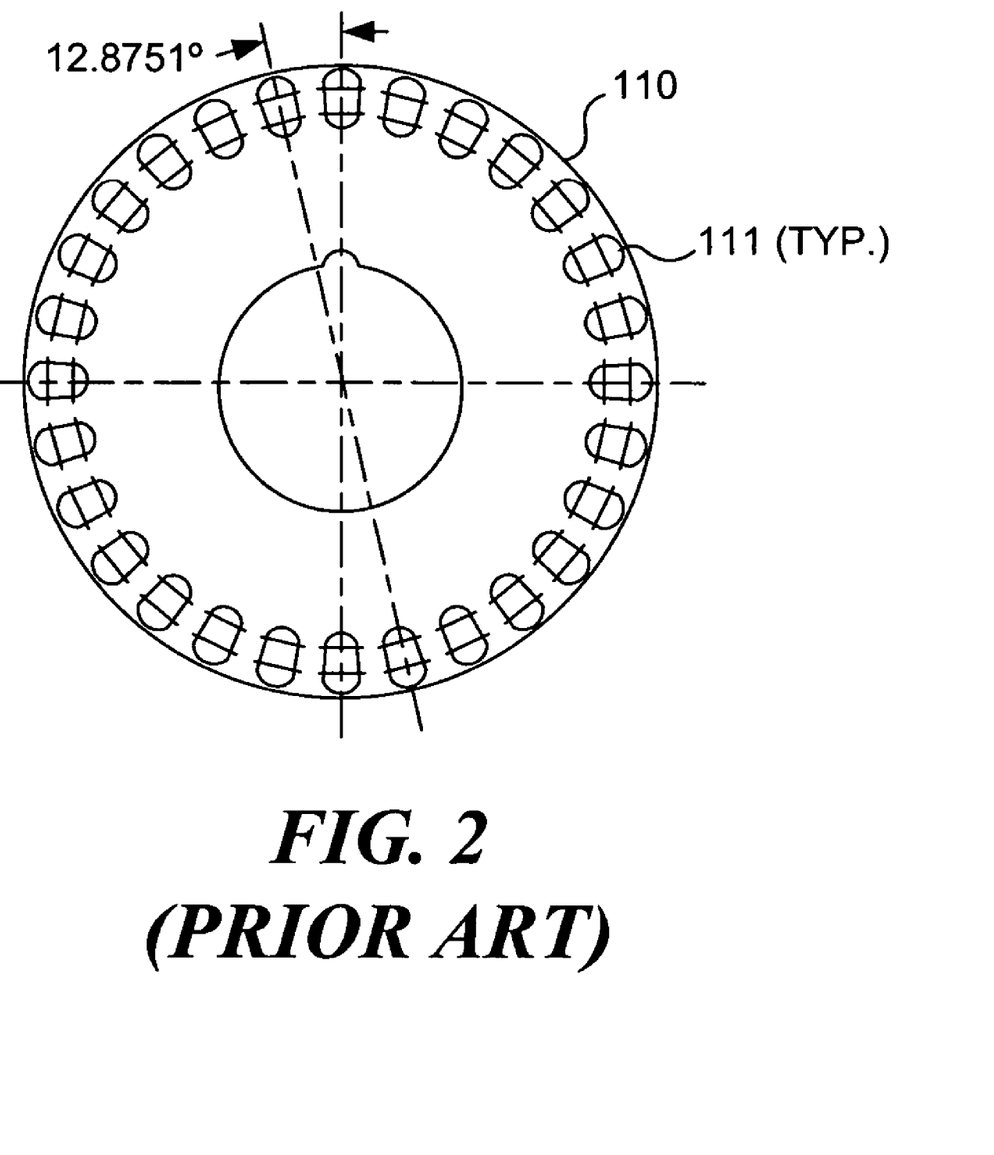
FIG. 2 (prior art) is a plan view of a lamination for a conventional induction machine rotor designed for die casting of the conductors that will be disposed in peripheral slots of the lamination.

FIG. 1A shows a typical (prior art) die-cast squirrel cage rotor 100 for a conventional induction machine employing a stack of laminations 101 with individual laminations 110, which are shown in FIG. 2 (prior art). Laminations 110 are stacked with slots 111 either aligned axially or aligned with a small skew relative to the axial direction. End rings 102, as shown in FIG. 1C on rotor 100 typically include fan blades, as shown, and often include other elements, such as balancing posts (not shown). The end rings and bars 103 are integrally die cast of aluminum to form a complete rotor conductor structure. Slot insulation 104, which as shown in FIG. 1B, is disposed between each cast bar 103 and lamination stack 101, may or may not be included in standard induction machines. Laminations 110 are each typically oxide coated to insulate the laminations from each other. Insulation systems for die-cast rotors may include an oxide coating on the laminations applied after punching the laminations from sheet stock, or an iron fluoride insulation coating, which is produced by a sulfur hexafluoride atmosphere treatment. An iron oxide slurry core-plating of the lamination stack may also be employed, as described in the above reference. U.S. Pat. No. 5,488,984 describes a procedure for applying insulation to the slots of rotor laminations using sodium tetraborate decahydrate and sodium nitrite. However, none of these prior art insulation systems provides ideal insulation for high efficiency and minimum unbalanced pull, and none enables an effective consumable pattern casting of the conductors with copper. Other prior art insulating systems for fabricated rotors either employ slot liners or use an insulating film that is applied to conductive bars that are then inserted into the slots; however, both of these approaches are expensive.

A prior art refractory insulation system for electrical coils is disclosed in U.S. Pat. No. 5,634,434. This insulation system is applied to wire during or just prior to winding of the wire into a coil. No reference is made to applying a refractory coating to any laminations comprising the core of the coil.

Casting Methods Applicable to Producing Rotors

The two most common consumable pattern casting methods are lost wax and lost foam. The lost wax method is widely used in jewelry and art casting and for casting difficult materials, such as titanium, which is sometimes used in turbine engine rotors. Because of its accuracy, the lost wax method is commonly used to produce complex parts with very close tolerances. The typical procedure is to produce a pattern of wax that is identical to the desired finished part, except that the pattern is made a small percentage oversize, to allow for the shrinkage of the cast metal during cooling. Gates, which are usually formed as short, small-diameter rods of wax, are added to the wax pattern to connect a sprue to the pattern, usually at the lowest points of the pattern. The sprue, also usually made of wax, defines the opening and path through which molten material is channeled into a mold and typically has a relatively large cross-sectional area to enable the molten casting metal to be carried from a funnel-shaped port at the top of the sprue, into the pattern area through the gates. Vents, formed either using small rods of wax or tubes, are added to the pattern at the high points and other locations, to provide a path for gases to escape during casting. The complete assembly, including pattern, gates, and sprue, is then coated with several layers of a refractory, usually applied by spraying or dipping in a water-solution, ceramic slurry that is allowed to air dry between coats. The ceramic is removed from the ends of the vents of the coated assembly, and the assembly is heated to melt away the wax and strengthen the ceramic coating, resulting in a preheated ceramic mold having the pattern cavity of the part to be cast. This mold is placed in a vents-up position while still hot from preheating, and molten metal is poured into the sprue cavity through the funnel-shaped port to fill the pattern cavity from the bottom up. Gases in the pattern cavity escape through the vents to enable complete filling of the pattern cavity. The metal in the gates freezes (solidifies) before the metal in the sprue, to prevent molten metal from the pattern cavity being pulled back into the sprue during the cooling process. After cooling, the ceramic mold is broken away from the casting and the metal of the gates, sprue and vents is removed, yielding the desired part.

An alternative to lost wax casting is lost foam casting. The lost foam casting technique is an industrial process that is particularly useful for producing complex shapes, such as aluminum engine blocks and cast iron electric motor shells. This process uses a consumable pattern, gates, and sprue—all formed of expanded polystyrene foam or other type of plastic foam. The foam pattern is typically formed by casting separate pieces of the finished assembly with expanded foam and gluing these pieces of foam together to form the complete consumable foam assembly. The foam assembly is then dipped into a water solution slurry containing a suspended refractory material. This slurry coats the pattern and leaves a thin heat-resistant, gas permeable layer after the coated assembly air dries. The coated foam is placed in a flask (i.e., an open top barrel), which is vibrated while sand is added. The sand settles around the coated pattern within the flask and mechanically supports the thin refractory layer before and during casting. Molten metal is then poured into the sprue part of the mold. The heat of the molten metal vaporizes the foam as the molten metal rises in the mold, filling the void that is formed in the mold as the foam vaporizes, to produce a nearly exact replica of the foam pattern. The pattern is again made slightly larger than the desired size of the metal part, to compensate for the shrinkage of the metal that occurs during cooling. The gas permeable refractory coating left behind after the foam has vaporized determines the shape of the part and vents the gases produced by the vaporized foam. Lost foam castings can optionally include metal inserts, which are inserted into the cast foam and supported as necessary before and during casting, so that the metal inserts become an integral part of the cast metal part.

Typically, the die-cast conductive structure of prior art rotors has been formed of aluminum metal, although, it would often be preferable to use copper conductors and end caps, because of the better electrical conductivity of copper compared to aluminum. Die-cast copper conductors have not been used in induction machine rotors because copper is cast at least at a 500-600° F. higher temperature than aluminum. The higher temperature used for making die-cast rotor conductor assemblies of copper places too much thermal stress on portions of the dies, resulting in very short die life. Indeed, even if cast from aluminum or other lower-temperature metal, the rotor conductor assemblies can place too much thermal stress on the conventional oxide coatings used for insulation and thereby cause electrical leakage currents.

Cast induction machine rotors therefore require a more effective rotor lamination stack insulating system to improve efficiency and reduce unbalanced magnetic pull, particularly, if it is desired to use cast copper for the conductors in the slots and for the end caps. Thus, an electrical insulating system that also provides thermal insulation of the lamination stack from the molten metal during casting enables lower pressure die casting or the use of consumable pattern casting with copper to improve efficiency. A more rugged lamination insulating system would also improve the cost effectiveness of fabricated rotors. A better (i.e., lower cost to fabricate and more effective) insulating system is clearly essential if doubly-fed cage rotors are to be feasible in commercial applications, since doubly-fed cage rotors will not operate properly if there are leakage currents through the insulation separating the conductors from the metal used for stack of laminations.

SUMMARY OF THE INVENTION

In accord with the present invention, as shown in FIG. 3, a thin layer, typically 0.005" to 0.010" thick, of a ceramic adhesive 204 including a ceramic binder and one or more powdered ceramic materials is applied to all or a portion of the surface inside each rotor slot 111 of rotor lamination stack 101, to insulate a slot conductor 203 from the lamination stack. It is also contemplated that the present invention can also be used on electrical machines that include a rotor with two stacks of laminations. The entire inside surface of each rotor slot is coated with the ceramic adhesive when the conductor is subsequently to be cast in-place within the slot. Alternatively, axial stripes of ceramic adhesive applied along the length of each slot may be used for rotors in which a fabricated conductor bar is to be inserted in the slot. These stripes are arranged to guide the bar during insertion and prevent the bar surface from contacting the uncoated lamination, while providing a passage for later injecting additional insulating material to fully fill the space between the bar and the inner surface of the lamination stack slot.

Squirrel cage rotor conductors, including end rings 202 and slot conductors 203, may be cast using standard casting techniques, such as die casting or consumable pattern casting, employing slots lined with ceramic adhesive 204 as part of the mold for the conductors. If desired, only a majority of the slots may include a cast conductor, e.g., by plugging the slots that are to remain free of the conductor before the casting process is carried out. The ceramic insulation provides thermal insulation between the molten metal and the lamination stack 101 during casting, enabling longer bars to be cast through the lamination stack than with other insulation methods, and then serves as an electrical insulator to prevent leakage currents from circulating in the laminations of the rotor during operation. This approach enables consumable pattern casting with copper, for reduced rotor losses, even though copper casting may be done at temperature approaching or even exceeding 2500° F.

Fabricated rotors can also be made by inserting conductive bars into the ceramic adhesive lined slots, and then finishing the rotor using standard fabricated rotor manufacturing techniques. Again, it is possible that the copper conductor will be inserted in a majority of the slots, leaving some slots open, without any conductor. The ceramic insulation still has superior thermal and electrical insulating properties, compared to conventional insulation systems used on prior art induction machine rotors.

The conductive bars used in the slots of brushless doubly-fed rotors, such as those described in U.S. Pat. No. 5,239,251, and in U.S. Pat. No. 6,278,211 (the drawings and specification of which are hereby specifically incorporated herein by reference), can be also be insulated from the laminations with this ceramic adhesive insulation method, to avoid the substantial parasitic torques that arise as a result of conventional die casting or non-insulated/poorly insulated inserted bar construction. The interconnection conductors between bars for these rotors can be cast simultaneously with the bars, using the consumable pattern casting technique, and employing copper for the conductors, to achieve reduced rotor losses.

Accordingly, claims for one aspect of the present invention are directed to a squirrel cage rotor for use in an electrical machine. The squirrel cage rotor includes at least one stack of metallic laminations affixed to a shaft. A plurality of spaced-apart openings are formed around a periphery of each metallic lamination and these openings are generally aligned in the stack, so as to define slots. These slots extend generally axially along the stack. A ceramic insulating coating is applied to at least a portion of an internal surface of each of the slots. The ceramic insulating coating is a substantially better thermal insulator and electrical insulator than the metallic laminations. At least one electrical conductor extends axially within each of at least a majority of the slots. Also, at least one electrically conductive component is included at an axial end of the at least one stack and is used for interconnecting electrical conductors that extend axially from the slots in the at least one stack.

The ceramic insulating coating comprises a binder and a ceramic powder, and the ceramic powder preferably includes at least one of an alumina, a berylia, a magnesia, a thoria, a zirconia, a zircon, a spinel, and a mullite powder. Most preferably the ceramic powder comprises an alumina powder. The binder of the ceramic insulating coating can comprise either an inorganic binder, or an organic-based material that is processed after the slots are lined (e.g., by heating) to substantially eliminate its organic content.

The conductor that extends through a slot can comprise a cast-in-place conductor that was formed in the slot using a molten metal, or can be a metal bar that is inserted through the slot. Similarly, the electrically conductive component that is provided at least at one axial end of the stack also preferably comprises a cast-in-place end cap that is formed using a molten metal, and preferably, when the cast-in-place conductors are formed in the slots. Because of its superior conductivity (compared to metals such as aluminum), the metal used for the cast-in-place conductors and the cast-in-place end cap preferably comprises copper.

In one embodiment, the plurality of slots are open on a peripheral edge of the at least one stack of metallic laminations. The squirrel cage rotor is adapted to be energized by one of a singly-fed stator, a doubly-fed stator having two sets of windings with different numbers of poles on a common lamination stack, or a doubly-fed stator having one set of windings on each of two lamination stacks, depending upon the type of electrical machine in which the squirrel cage rotor will be employed.

In one preferred embodiment, the ceramic insulating coating is applied over substantially an entire internal surface of each slot. Also, in at least one embodiment, the ceramic insulating coating is formed as a plurality of generally axially extending ridges that are spaced apart around the internal surface of each of the plurality of slots. These ridges are substantially thicker than the ceramic insulating coating covering the internal surface of the plurality of slots that is between the ridges.

Another aspect of this invention is directed to a method for fabricating a squirrel cage rotor for use in an electrical machine. The steps of the method are generally consistent with the functionality of the components of the squirrel cage rotor discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3A:
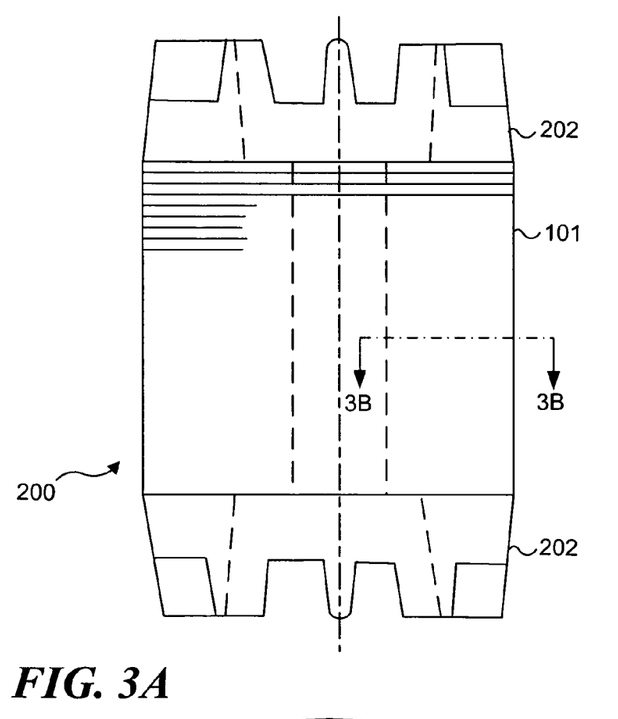
FIG. 3A is a side-elevational view of a cast cage rotor for a conventional induction machine employing ceramic slot insulation in accord with the present invention.
Figure 3B:
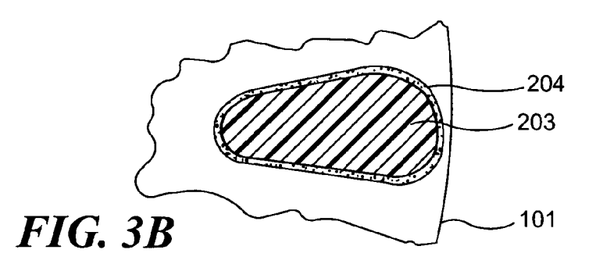
FIG. 3B is an enlarged portion of a cross-sectional view of the cast cage rotor of FIG. 3A, taken along section line 3B-3B, showing one slot with the ceramic insulation.
Figure 3C:
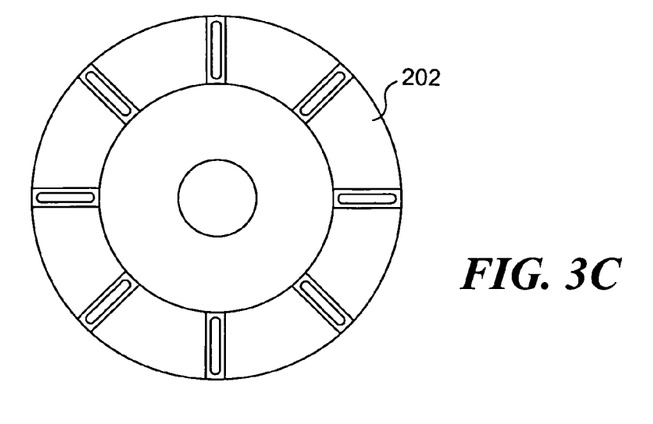
FIG. 3C is an end view of the cast cage rotor of FIG. 3A.

A preferred embodiment of a conventional singly-fed induction machine squirrel cage rotor 200 with ceramic adhesive insulated slots, in accord with the present invention, is shown in FIGS. 3A, 3B, and 3C. Ceramic adhesive coating 204, which is applied on the inside surface of the closed slots in lamination stack 101, thermally and electrically insulates cast slot conductors 203 from the lamination stack. End rings 202 electrically connect all conductors 203 at each end of the rotor. Coating 204 provides substantial thermal insulation of the molten metal from the large mass of the steel lamination stack during the brief (about one second) casting period, but does not substantially reduce the transfer of heat from conductors 203 to the lamination stack during subsequent operation of the induction machine. Rotor 200 is generally identical to a conventional squirrel cage rotor, like that shown in prior art views of FIGS. 1A, 1B, and 1C, except that it includes ceramic adhesive coating 204, which is used for the slot insulation, and except for the use of copper (instead of aluminum) to form end rings 202 and conductors 203.

The ceramic adhesive coating used in embodiments of the present invention is selected because it has the following properties:

1. suitable for application on steel laminations as a coating that may range in thickness from about 0.00541 to 0.010";
2. coefficient of thermal expansion similar to steel;
3. minimum electrical insulation of about $10^8$ ohm-cm;

4. no outgassing when exposed to molten metal during casting of the conductor;

5. strong enough to withstand subsequent manufacturing processes and operating stresses; and 6. thermal conductivity in the range from about 3% to about 10% of that of steel. The lower conductivity aids in casting by reducing heat loss from the molten metal into the laminations during the brief casting period, while adequately conducting heat from the conductors to the lamination stack during operation of the electrical machine in which the rotor is used.

A wide range of ceramic adhesives that generally meet the above criteria and are readily available include a ceramic binder and one or more powdered ceramic materials. Typical ceramic materials that are usable include alumina, berylia, magnesia, thoria, zirconia, zircon, spinel, and mullite. Ideal binders are inorganic, although partially organic binders may be used provided they are heat treated at sufficiently high temperatures to drive off the organic materials prior to casting. For example, an alumina-based ceramic adhesive, Resbond 989™, from Cotronics Corp. provides a good combination of the desired properties.

Figure 7:
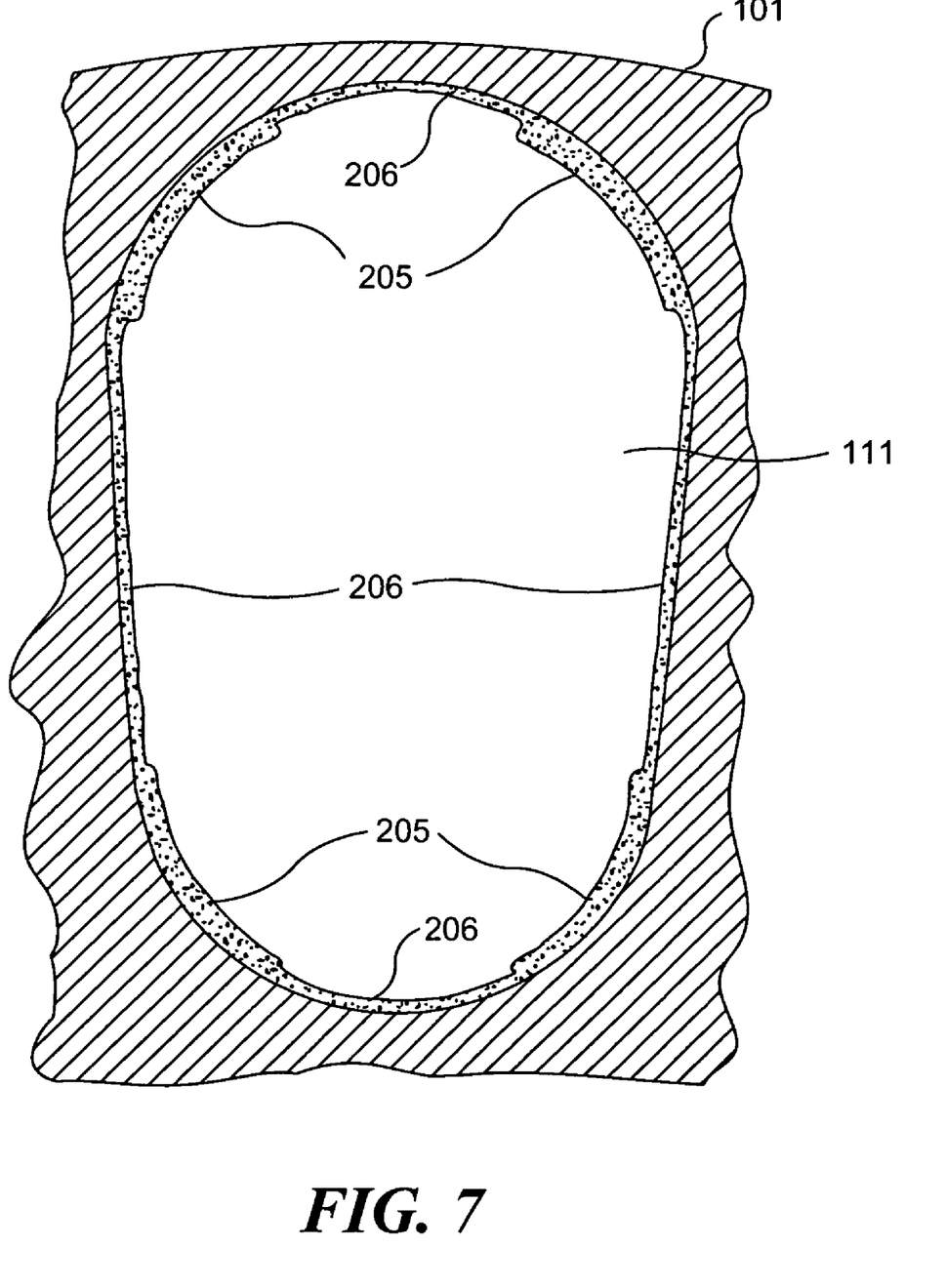
FIG. 7 is an enlarged cross sectional view of one rotor slot after the ceramic slot insulation has been applied in axial stripes in the slots, in accord with this invention.

The desired coating properties are attained by a procedure that includes the steps of:

1. cleaning the interior surface of the slots with a solvent;

2. coating the interior surface of the slots with a water-adhesive thinner mixture to fill gaps in the lamination stack;

3. coating the interior surface of the slots with a first coating of the Resbond 989 ceramic adhesive thinned slightly with an appropriate water-adhesive thinner, typically in a pattern similar to that shown in the cross-sectional view of FIG. 7; ridges 205 in each slot 111 serve to guide a tool that is also used to apply the second coating, as described below, in order to shape the coating on the interior surface of the slots to a desired thickness and shape;

4. air drying the first ceramic adhesive coating;

5. coating the interior surface of the slots with a second coating of a suitable ceramic adhesive, such as Cotronics ceramic adhesive, Resbond 989™, thinned slightly with the water-adhesive thinner, to achieve a constant thickness in the range of about 0.005" to about 0.010", using the tool; the tool is guided by the ridges of the first coating, to center the coating and shape the interior surface of the coating to the desired uniform thickness;

6. air drying the second ceramic adhesive coating; and 7. heat treating the assembly at a temperature of approximately 450° F., to attain a maximum available coating strength.

An exemplary preferred embodiment uses lost foam casting to form the rotor bars and end rings from copper. A completed rotor assembly 300, prior to casting, is shown in FIG. 4, and an enlarged view of an upper end ring 302 of this rotor assembly is illustrated in FIG. 5.

Lamination stack 101 is clamped on a mandrel 301, and a ceramic adhesive coating 204 is applied to the interior surface of slots 111, as described above. Foam end ring patterns 302 and 303 each include fan blades and balance posts, as is typical in die cast rotors. A short protrusion (typically about 0.10" in length), which extends into each rotor slot 111, serves to position the end ring relative to the lamination stack. Upper end ring pattern 302 includes vents 306 from each slot 111 to enable gas to escape through vent tubes 307 during the casting process. The end ring patterns are adhesively secured to lamination stack 101. The interior volume of closed slots 111 is left open, except for the protrusions described above. FIG. 5 is an enlarged cross-sectional view through end ring pattern 302. This end ring includes the fan blades, vent 306 through the foam, and vent tube 307. The vent tube is supported by a collar 308.

Figure 4:
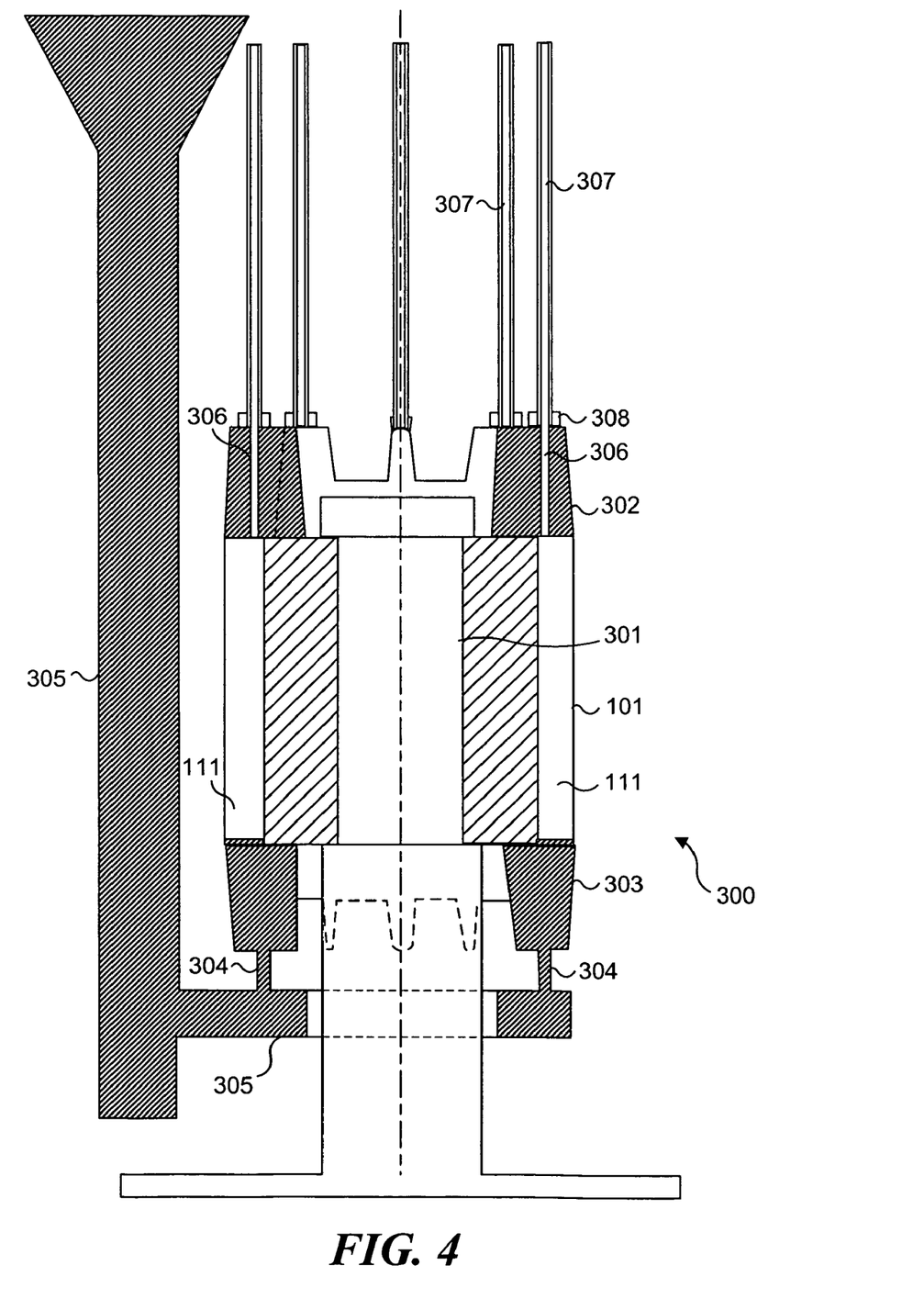
FIG. 4 is a cross-sectional along a rotor centerline through the rotor slots and fan blades of a conventional induction machine rotor lamination stack that includes the ceramic slot insulation, in accord with the present invention, applied to all slot surfaces, and with foam components added to enable lost foam casting of conductors.
Figure 5:
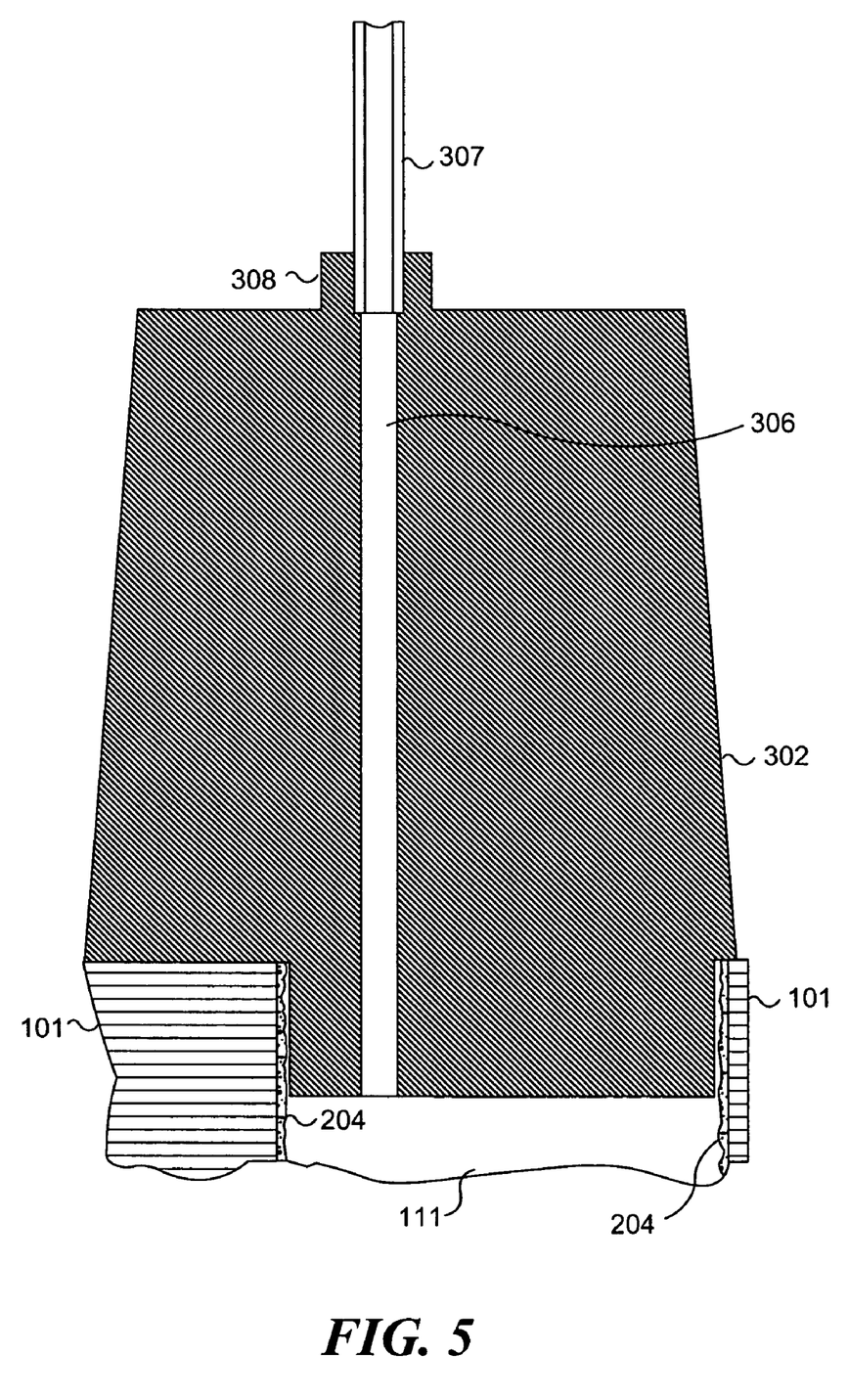
FIG. 5 is an enlarged portion of the cross-sectional view of FIG. 4, showing part of the end ring section.
Figure 6:
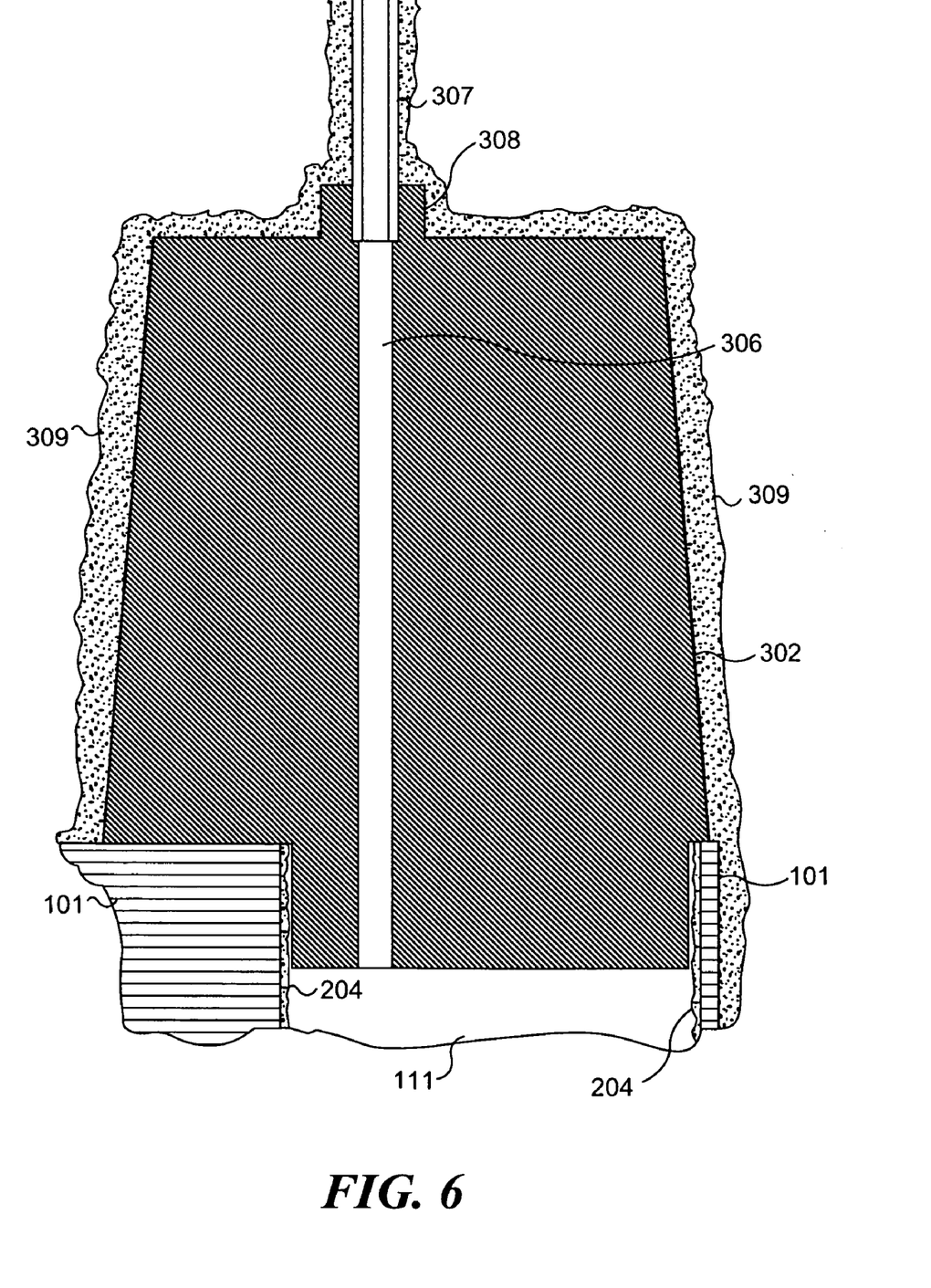
FIG. 6 is an enlarged portion of the cross-sectional view of FIG. 4, after coating the end ring section with a refractory material, in preparation for lost foam casting of the rotor conductors.

The rotor assembly of FIG. 4 is prepared for lost foam casting in the conventional way, with foam gates 304 attached to lower end ring 303 to feed molten metal into the end ring from the larger cross-sectional area of a sprue 305. The assembly is then coated with a gas permeable layer 309 of clay or other material and air dried. FIG. 6 illustrates an enlarged view of end ring 302, as shown in FIG. 5, after the end ring has been coated with gas permeable layer 309. Completed rotor assembly 300, which is now coated with gas permeable layer 309, is placed in a flask, oriented with upper end ring 302 at the top end. Sand is then added so that it surrounds the completed rotor assembly, while the flask is vibrated to settle the sand in close and supporting conformance to the completed rotor assembly shape.

Molten copper is then poured into sprue 305 and flows through gates 304. The heat of the molten copper vaporizes the foam and the copper flows into the slots and into the voids thus formed within the mold by the lost foam, as well as into the voids formed inside the coating of the ceramic adhesive within the slots, and forms the conductors and end rings. Ceramic adhesive 204, which coats the interior surface of slots 111, forms part of the mold for the cage structure. The ceramic adhesive coating insulates the molten copper from the much cooler laminations during casting, to enable longer conductors to be cast through the laminations, since if excess heat were lost into the stack of laminations, the molten copper would solidify before completely forming the conductors in each slot. The lost foam casting process employed to form the copper conductors and end ring(s) is thus generally conventional, except for the use of the ceramic adhesive coating the surface of the slots, as part of the mold, which has not previously been done in the art.

An alternate casting method involves coating complete rotor assembly 300, prepared as described above, with a ceramic coating that covers the assembly and is typically applied in several layers by dipping the complete rotor assembly in a ceramic slurry that is allowed to dry between dips. The complete rotor assembly is then heated to about 1200° F. to vaporize the foam, leaving a preheated mold. Molten copper is then poured into the resulting voids within the mold while the lamination stack is still hot from the step of preheating. The ceramic coating of the slots and the end rings form the mold for the conducting structure, so that the molten metal is shaped into the desired form for the conductors and end ring(s). An advantage of this alternative method is that the preheated lamination stack reduces premature cooling of the molten copper and enables the molten copper to flow through even longer stack lengths than is possible with the lost foam method described above. This alternative method is similar to conventional lost wax casting, except that the consumable pattern is formed of expanded polystyrene foam rather than wax, and the ceramic adhesive coated slots are used as part of the mold to define the shape of the cast copper.

A further alternative casting method is the traditional lost wax casting process, where complete rotor assembly 300 is again prepared as described above, except that the conductors are formed of wax rather than polystyrene foam, and the ceramic adhesive coated slots are used as part of the mold.

The preferred embodiment that was initially described above is applicable in fabricating brushless doubly-fed induction machine rotors of the type described in U.S. Pat. No. 5,239,251, which uses one rotor lamination stack with an end ring on one end, and insulated connections between the rotor bars on the opposite end. These rotors require electrical insulation between the rotor bars and the laminations. The rotors may use either open or closed lamination slots, depending upon the design, with closed slots normally preferably being used for cast rotors, and open slots preferably being used with rotors that have conductors inserted through the slots. A preferred embodiment for casting these rotors is as described above, except that upper end ring 302 in FIG. 4 is replaced with foam conductor patterns that when replaced with metal during the casting process, provide the desired rotor bar interconnections. Vents are added to these conductor patterns as required for successful casting.

Figure 9:
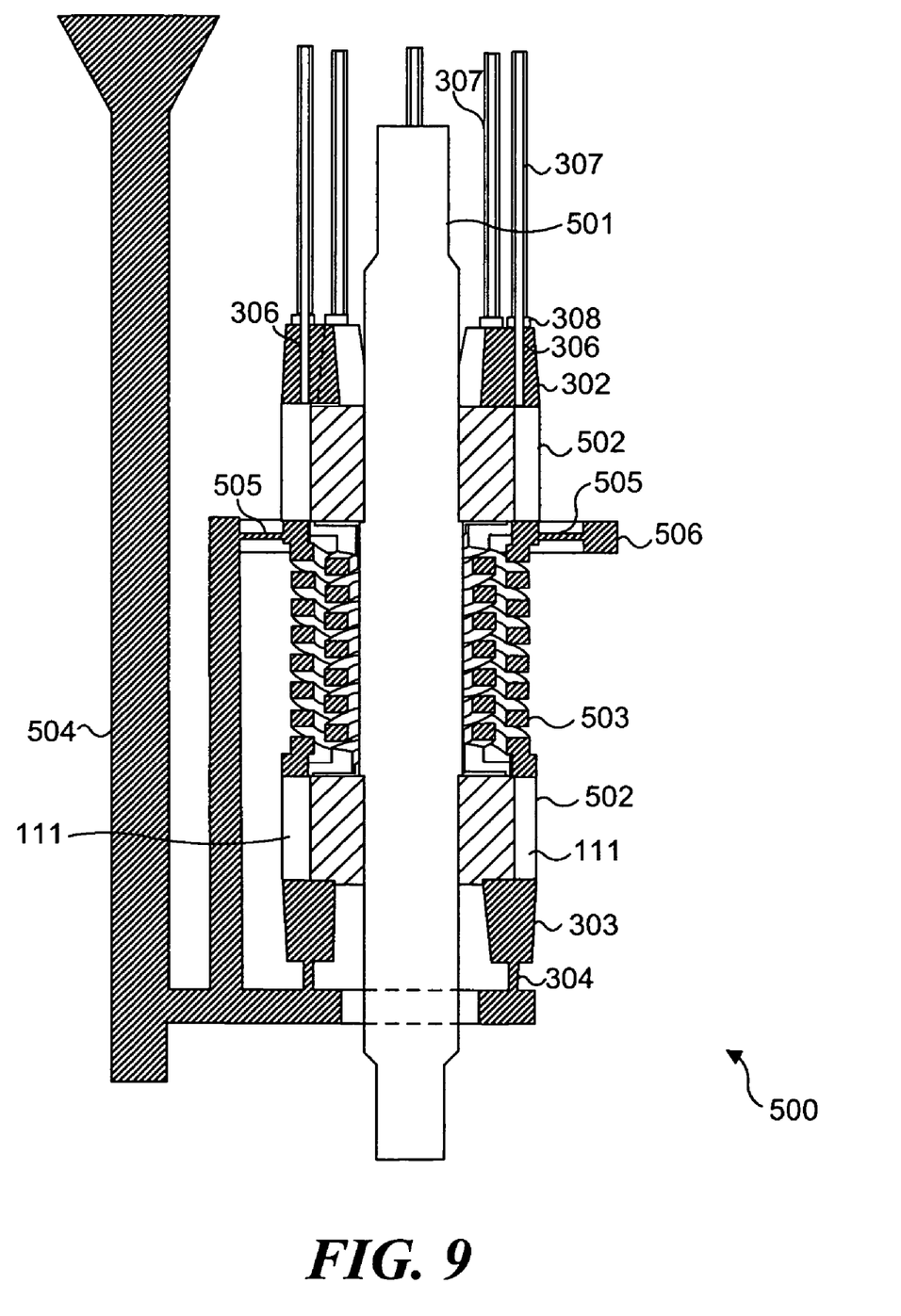
FIG. 9 is a cross-sectional view of an assembly for casting a rotor like that of FIG. 4, except the rotor includes two stacks of laminations that are spaced-apart to accommodate interconnection conductors that extend between the conductors in the slots of each stack of laminations.

In addition, the preferred embodiment initially described above is applicable to brushless doubly-fed induction machine rotors of the type described in U.S. Pat. No. 6,278,211, which uses two rotor lamination stacks on a common shaft, and which has an end ring on the outer end of each stack of laminations used for each rotor, and insulated interconnections between the inner ends of the conductive bars extending through the slots of one lamination stack and inner ends of the conductive bars extending through the slots of the other lamination stack. The specification and drawings of U.S. Pat. No. 6,278,211 are hereby specifically incorporated herein by reference. These brushless doubly-fed induction machine rotors require electrical insulation of the rotor bars relative to the laminations, except at the end rings. They may use either open or closed lamination slots, depending upon the design, with closed slots normally preferably being used for cast rotors, and open slots preferably being used with rotors that have conductors inserted through the slots. The preferred embodiment for casting these rotors is the lost foam method of consumable pattern casting using an assembly 500 as shown in FIG. 9. Two lamination stacks 502 are mounted on a shaft (or mandrel) 501 and are spaced apart to provide space for interconnection conductor patterns 503. The end rings, gates, vents and sprue are as described for FIG. 4, except that a ring 506 at the top of a sprue 504 feeds molten metal to each interconnection conductor through additional gates 505. These additional gates provide the required flow of molten metal to the upper stator and interconnection conductors. Other added sprues and gates may be required on larger rotors. To avoid adding vents, the preferred embodiment casting method is the alternate casting method described above, where assembly 500 is coated with several layers of ceramic adhesive and is heated to about 1200° F. to vaporize the foam and preheat the mold. Then, molten metal, such as copper, is poured into the sprue while the assembly is still hot.

Figure 8:
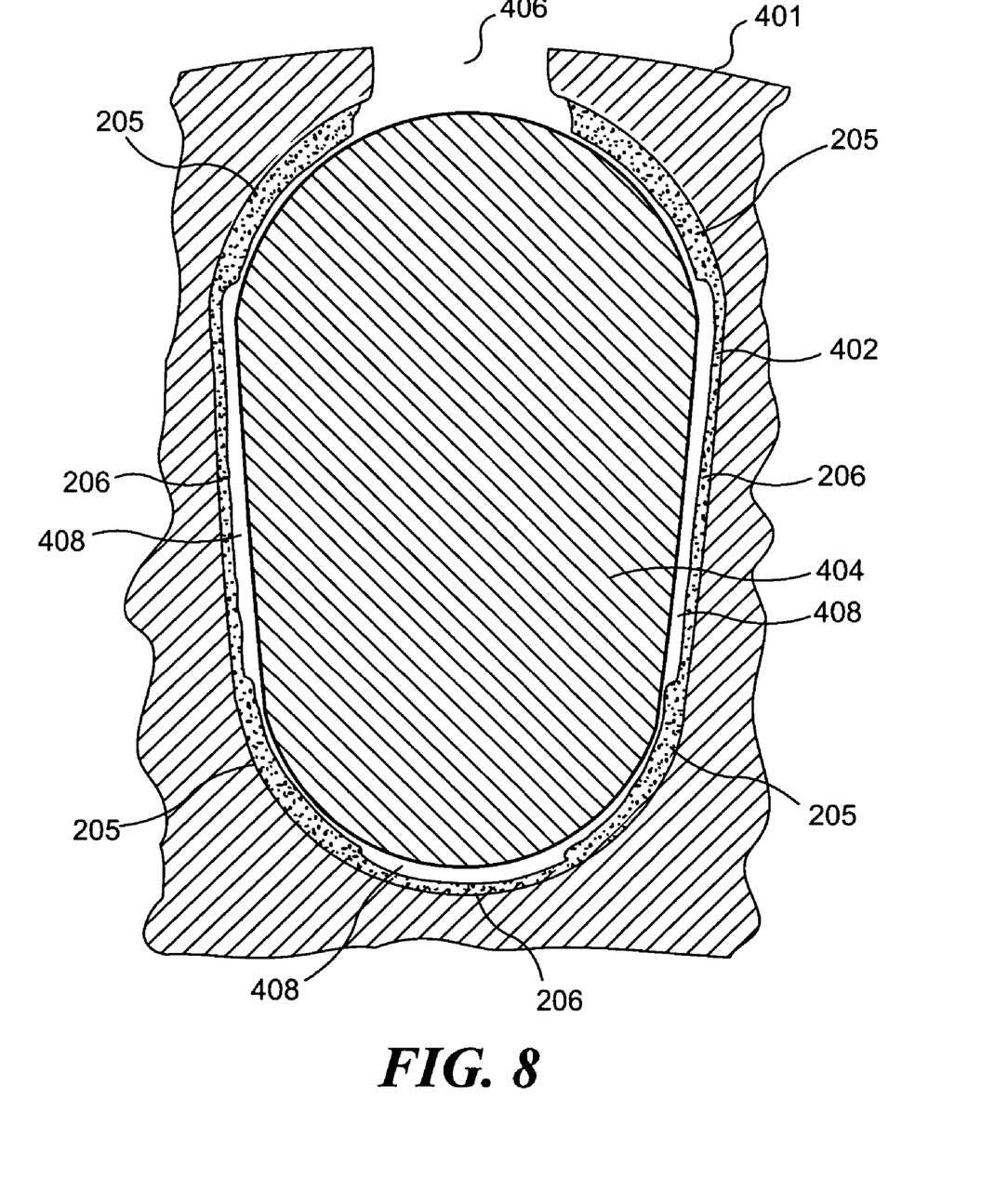
FIG. 8 is an enlarged cross sectional view of one open rotor slot (from a rotor having open instead of closed slots) after the ceramic slot insulation has been applied in axial stripes in the open slots, in accord with one embodiment of the present invention.

It will be understood that the insulation method of the present invention is also thus applicable in providing insulation on open slot rotors that are used on either conventional singly-fed or doubly-fed, fabricated rotor induction machines. FIG. 8 shows a cross-sectional view of an open slot 402 (having an opening 406) in a lamination stack 401 that has been insulated with a ceramic adhesive coating. This coating covers the entire internal surface of the slots, but is applied in axial stripes or ridges 205, with thinner areas 206 disposed between the ridges, as described above, in connection with FIG. 7. A copper conductor 404 that has been inserted into slot 402 is shown generally centered in the slot, but may instead be offset from the center. Insulating axial stripes or ridges 205 prevent copper conductor 404 from contacting lamination stack 401 in slot 402, while providing gaps 408 that are defined between thinner insulation areas 206 and the outer surface of copper conductor 404. Additional insulation (not shown) may optionally be injected into gaps 408 later in the manufacturing process. An alternate method is to provide a constant thickness insulation layer 204 on the internal surface of the slots, as shown in FIG. 3.

Although the present invention has been described in connection with the preferred form of practicing it and modifications thereto, those of ordinary skill in the art will understand that many other modifications can be made to this invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for fabricating a squirrel cage rotor for use in an electrical machine, comprising the steps of:
   (a) forming at least one stack of metallic laminations affixed to either a shaft or a mandrel, each metallic lamination including a plurality of spaced-apart openings disposed around a periphery of the lamination and generally aligned in the at least one stack, so as to define slots that extend generally axially along the at least one stack;
   (b) applying a ceramic insulating coating to at least a portion of an internal surface of each of the slots, said ceramic insulating coating having both a thermal insulating characteristic and an electrical insulation characteristic that are substantially greater than thermal and electrical insulating characteristics of the metallic laminations;
   (c) providing at least one electrical conductor extending axially within each of at least a majority of the slots, the step of providing at least one electrical conductor including the steps of:
      (i) heating an electrically conductive metal to a molten state;
      (ii) casting an electrical conductor within each of the at least the majority of the slots using the electrically conductive metal that has been heated to the molten state and a consumable pattern; and
      (iii) enabling the electrically conductive metal cast as the electrical conductor within each of the at least the majority of the slots to cool to an ambient temperature; and
   (d) electrically interconnecting the electrical conductors extending axially within the slots in the at least one stack.

2. The method of claim 1, wherein the step of casting comprises the step of employing one of:
   (a) a lost foam casting process in which a plastic foam comprises the consumable pattern; and
   (b) a lost wax casting process in which a wax material comprises the consumable pattern.

3. The method of claim 1, wherein the electrically conductive metal comprises copper.

4. The method of claim 1, wherein the step of applying the ceramic insulating coating comprises the steps of:
   (a) cleaning the interior surface of the slots;
   (b) filling any gaps between the metallic laminations comprising the stack;
   (c) coating the interior surface of the slots with a ceramic adhesive; and
   (d) heat treating the stack at a substantially elevated temperature, to substantially increase a coating strength for the ceramic adhesive.

5. The method of claim 4, wherein the step of applying the ceramic insulating coating further comprises the steps of:
   (a) air drying the ceramic adhesive coating;
   (b) applying another coat of the ceramic adhesive over the ceramic adhesive already coating the interior surface of the slots; and
   (c) air drying the other coat of the ceramic adhesive before the step of heat treating.

6. The method of claim 4, wherein the step of coating the interior surface of the slots comprises the step of applying a relatively thicker coating of the ceramic adhesive to form ridges that extend axially through the slots and are spaced apart on the internal surface of the slots, with a relatively thinner coating of the ceramic adhesive on the internal surface of the slots between the ridges.

7. The method of claim 1, wherein the ceramic insulating coating comprises a binder and a ceramic powder.

8. The method of claim 7, wherein the ceramic powder includes at least one of an alumina, a berylia, a magnesia, a thoria, a zirconia, a zircon, a spinel, and a mullite powder.

9. The method of claim 7, wherein the ceramic powder most preferably comprises an alumina powder.

10. The method of claim 7, wherein the binder of the ceramic insulating coating comprises an inorganic binder.

11. The method of claim 7, wherein the binder of the ceramic insulating coating comprises an organic-based material that is processed after being applied to the interior surface to substantially eliminate an organic content.

12. The method of claim 1, wherein the step of electrically interconnecting the electrical conductors comprises the steps of:
   (a) providing a consumable pattern defining a shape of at least one end cap adapted to fit an end of the squirrel cage rotor;
   (b) heating an electrically conductive metal to form a molten metal;
   (c) using the consumable pattern, casting at least one end cap from the molten metal; and
   (d) enabling the at least one end cap to cool substantially to an ambient temperature, said at least one end cap electrically interconnecting the electrical conductors extending through the slots.

13. The method of claim 12, wherein the step of casting comprises the step of casting the at least one end cap in place on the at least one stack by employing one of:
   (a) a lost foam casting process, in which a plastic foam comprises the consumable pattern; and
   (b) a lost wax casting process in which a wax material comprises the consumable pattern.

14. The method of claim 12, further comprising the step of vaporizing the consumable pattern with one of the steps of:
   (a) vaporizing the consumable pattern with the molten metal; and
   (b) preheating an assembly that includes the consumable pattern before the step of casting with the molten metal, so that heat thus applied vaporizes the consumable pattern, yielding a void into which the molten metal subsequently flows during the step of casting.

15. The method of claim 14, wherein before the step of preheating the assembly, further comprising the step of coating an assembly that includes the at least one stack and the consumable pattern with a ceramic slurry, said ceramic slurry drying to form a shell that defines the void after the step of preheating has vaporized the consumable pattern, and before the step of casting that fills the void with the molten metal.

16. The method of claim 12, wherein the electrical conductor comprises copper.

17. The method of claim 12, wherein before the step of casting, further comprising the steps of:
   (a) creating an assembly of components that includes a sprue, at least one foam gate, at least one vent, the at least one stack in which the at least the portion of the internal surface of the slots is coated with the ceramic insulating coating, and the consumable pattern for at least one end cap;
   (b) coating the assembly with a gas permeable layer, producing a coated assembly;
   (c) placing the coated assembly into a container; and
   (d) adding particulate material that is heat resistant and conforms around the coated assembly within the container to provide support during the step of casting.

18. The method of claim 1, wherein the step of electrically interconnecting the electrical conductors comprises the steps of:
   (a) forming a consumable pattern defining an end cap for each end of the stack, said consumable pattern also defining fan blades, vents extending into the slots, and balancing posts for each end cap;
   (b) assembling the consumable patterns to at least one end of the stack; and
   (c) casting the end cap for at least one end of the at least one stack and the electrical conductor extending axially through the at least the majority of the slots, in place, with a molten metal.

19. A method for fabricating a squirrel cage rotor for use in an electrical machine, comprising the steps of:
   (a) forming at least one stack of metallic laminations affixed to either a shaft or a mandrel, each metallic lamination including a plurality of spaced-apart openings disposed around a periphery of the lamination and generally aligned in the at least one stack, so as to define slots that extend generally axially along the at least one stack;
   (b) applying a ceramic insulating coating to at least a portion of an internal surface of each of the slots, said ceramic insulating coating having both a thermal insulating characteristic and an electrical insulation characteristic that are substantially greater than thermal and electrical insulating characteristics of the metallic laminations, the step of applying the ceramic coating including the steps of:
      (i) cleaning the interior surface of the slots;
      (ii) filling any gaps between the metallic laminations comprising the stack;
      (iii) coating the interior surface of the slots with a ceramic adhesive; and
      (iv) heat treating the stack at a substantially elevated temperature, to substantially increase a coating strength for the ceramic adhesive;
   (c) providing at least one electrical conductor extending axially within each of at least a majority of the slots; and
   (d) electrically interconnecting the electrical conductors extending axially within the slots in the at least one stack.

20. The method of claim 19, wherein the step of applying the ceramic insulating coating further comprises the steps of:
   (a) air drying the ceramic adhesive coating;
   (b) applying another coat of the ceramic adhesive over the ceramic adhesive already coating the interior surface of the slots; and (c) air drying the other coat of the ceramic adhesive before the step of heat treating.

21. The method of claim 19, wherein the step of coating the interior surface of the slots comprises the step of applying a relatively thicker coating of the ceramic adhesive to form ridges that extend axially through the slots and are spaced apart on the internal surface of the slots, with a relatively thinner coating of the ceramic adhesive on the internal surface of the slots between the ridges.

22. A method for fabricating a squirrel cage rotor for use in an electrical machine, comprising the steps of:
(a) forming at least one stack of metallic laminations affixed to either a shaft or a mandrel, each metallic lamination including a plurality of spaced-apart openings disposed around a periphery of the lamination and generally aligned in the at least one stack, so as to define slots that extend generally axially along the at least one stack;
(b) applying a ceramic insulating coating to at least a portion of an internal surface of each of the slots, said ceramic insulating coating having both a thermal insulating characteristic and an electrical insulation characteristic that are substantially greater than thermal and electrical insulating characteristics of the metallic laminations;
(c) providing at least one electrical conductor extending axially within each of at least a majority of the slots by inserting at least one conductive metal bar into each such slot so that the conductive metal bar extends axially through the slot from opposite ends thereof, the conductive metal bar comprising the at least one electrical conductor; and
(d) electrically interconnecting the electrical conductors extending axially within the slots in the at least one stack.

23. The method of claim 22, wherein the step of applying the ceramic insulating coating comprises the steps of:
(a) cleaning the interior surface of the slots;
(b) filling any gaps between the metallic laminations comprising the stack;
(c) coating the interior surface of the slots with a ceramic adhesive; and
(d) heat treating the stack at a substantially elevated temperature, to substantially increase a coating strength for the ceramic adhesive.

24. The method of claim 23, wherein the step of applying the ceramic insulating coating further comprises the steps of:
(a) air drying the ceramic adhesive coating;
(b) applying another coat of the ceramic adhesive over the ceramic adhesive already coating the interior surface of the slots; and
(c) air drying the other coat of the ceramic adhesive before the step of heat treating.

25. The method of claim 23, wherein the step of coating the interior surface of the slots comprises the step of applying a relatively thicker coating of the ceramic adhesive to form ridges that extend axially through the slots and are spaced apart on the internal surface of the slots, with a relatively thinner coating of the ceramic adhesive on the internal surface of the slots between the ridges.

26. The method of claim 22, wherein the ceramic insulating coating comprises a binder and a ceramic powder.

27. The method of claim 26, wherein the ceramic powder includes at least one of an alumina, a berylia, a magnesia, a thoria, a zirconia, a zircon, a spinel, and a mullite powder.

28. The method of claim 26, wherein the ceramic powder most preferably comprises an alumina powder.

29. The method of claim 26, wherein the binder of the ceramic insulating coating comprises an inorganic binder.

30. The method of claim 26, wherein the binder of the ceramic insulating coating comprises an organic-based material that is processed after being applied to the interior surface to substantially eliminate an organic content.

31. A method for fabricating a squirrel cage rotor for use in an electrical machine, comprising the steps of:
(a) forming at least one stack of metallic laminations affixed to either a shaft or a mandrel, each metallic lamination including a plurality of spaced-apart openings disposed around a periphery of the lamination and generally aligned in the at least one stack, so as to define slots that extend generally axially along the at least one stack;
(b) applying a ceramic insulating coating to at least a portion of an internal surface of each of the slots, said ceramic insulating coating having both a thermal insulating characteristic and an electrical insulation characteristic that are substantially greater than thermal and electrical insulating characteristics of the metallic laminations;
(c) providing at least one electrical conductor extending axially within each of at least a majority of the slots; and
(d) electrically interconnecting the electrical conductors extending axially within the slots in the at least one stack, the step of electrically interconnecting including the steps of:
(i) providing a consumable pattern defining a shape of at least one end cap adapted to fit an end of the squirrel cage rotor;
(ii) heating an electrically conductive metal to form a molten metal;
(iii) using the consumable pattern, casting at least one end cap from the molten metal; and
(iv) enabling the at least one end cap to cool substantially to an ambient temperature, said at least one end cap electrically interconnecting the electrical conductors extending through the slots.

32. A method for fabricating a squirrel cage rotor for use in an electrical machine, comprising the steps of:
(a) forming at least one stack of metallic laminations affixed to either a shaft or a mandrel, each metallic lamination including a plurality of spaced-apart openings disposed around a periphery of the lamination and generally aligned in the at least one stack, so as to define slots that extend generally axially along the at least one stack;
(b) applying a ceramic insulating coating to at least a portion of an internal surface of each of the slots, said ceramic insulating coating having both a thermal insulating characteristic and an electrical insulation characteristic that are substantially greater than thermal and electrical insulating characteristics of the metallic laminations;
(c) providing at least one electrical conductor extending axially within each of at least a majority of the slots; and
(d) electrically interconnecting the electrical conductors extending axially within the slots in the at least one stack, the step of electrically interconnecting including the steps of:
(i) forming a consumable pattern defining an end cap for each end of the stack, said consumable pattern also defining fan blades, vents extending into the slots, and balancing posts for each end cap;

(ii) assembling the consumable patterns to at least one end of the stack; and
(iii) casting the end cap for at least one end of the at least one stack and the electrical conductor extending axially through the at least the majority of the slots, in place, with a molten metal.

* * * * *